United States Patent
Winkler et al.

[15] 3,655,278
[45] Apr. 11, 1972

[54] MOTION PICTURE CAMERA

[72] Inventors: Friedrich Winkler; Johann Zanner, both of Unterhaching, Germany

[73] Assignee: Agfa-Gevaert Aktiengesellschaft, Leverkusen, Germany

[22] Filed: Feb. 2, 1970

[21] Appl. No.: 7,566

[30] Foreign Application Priority Data

Feb. 7, 1969  Germany...................G 69 04 668.0

[52] U.S. Cl............................................................352/74
[51] Int. Cl...................................................G03b 23/02
[58] Field of Search............352/74, 72, 78; 95/31 R, 31 CA; 274/4 E

[56] References Cited

UNITED STATES PATENTS

| | | | |
|---|---|---|---|
| 2,504,317 | 4/1950 | Frankel | 352/74 |
| 2,183,529 | 12/1939 | Fairbanks | 352/74 |
| 2,449,626 | 9/1948 | Suthann | 352/74 |
| 3,273,815 | 9/1966 | Schuller | 274/4 E UX |
| 3,282,185 | 11/1966 | Engelsmann et al. | 95/31 R |
| 3,458,158 | 7/1969 | Ohira | 274/4 E UX |
| 3,524,651 | 8/1970 | Ketzer | 274/4 E |

Primary Examiner—Louis R. Prince
Assistant Examiner—Joseph W. Roskos
Attorney—Michael S. Striker

[57] ABSTRACT

A motion picture camera having a cassette-receiving chamber which extends inwardly from the rear wall of the housing and is flanked by two side walls which converge toward each other in a direction away from the open end of the chamber. One of the side walls carries a coupling which can rotate the reel or reels in an inserted cassette, and a pair of elastic U-shaped springs which flank the coupling and hold the cassette away from the coupling during insertion or withdrawal through the open end of the chamber. A freshly inserted cassette is pivoted toward the one side wall to deform the springs and to engage with the coupling in response to closing of a door for the open end of the chamber.

12 Claims, 2 Drawing Figures

PATENTED APR 11 1972

3,655,278

INVENTOR
FRIEDRICH WINKLER
JOHANN ZANNER jun.

BY

MOTION PICTURE CAMERA

BACKGROUND OF THE INVENTION

The present invention relates to apparatus which employ magazines or cassettes containing convoluted band material, such as motion picture film or magnetic tape. More particularly, the invention relates to improvements in apparatus wherein the reel or reels in a cassette for convoluted band material must be moved into torque-receiving engagement with a rotary coupling which causes the reel or reels to rotate when the apparatus is in use. Though the invention can be embodied in motion picture cameras as well as in sound recording and/or reproducing apparatus, it will be described with reference to motion picture cameras with the understanding, however, that its use is not limited to cameras.

In certain type of motion pictures cameras wherein the chamber for reception of a film-containing magazine or cassette extends inwardly from the rear end wall or another narrow wall of the housing, the insertion or removal of cassettes presents problems, mainly because the cassette must be disengaged from the coupling which serves to rotate the reel or reels for motion picture film when the camera is in use. If the coupling cannot move axially, it is likely to interfere with insertion or removal of cassettes. Therefore, many motion picture cameras employ axially movable spring-biases couplings which can yield during insertion or removal of cassettes but are free to engage the core or cores of the reel or reels in the cassette when the latter is properly accommodated in the housing. Such mounting of couplings involves additional expenditures without completely eliminating the possibility that the coupling will interfere with insertion or removal of a cassette.

SUMMARY OF THE INVENTION

An object of the invention is to provide an apparatus which utilizes cassettes for convoluted band-like material, particularly a motion picture camera which utilizes cassettes or magazines for motion picture film, wherein the coupling cannot interfere with insertion or withdrawal of a cassette from its chamber in the housing of the apparatus.

Another object of the invention is to provide a motion picture camera of the just outlined character wherein a properly inserted cassette is automatically caused to engage with the coupling when the chamber for the cassette is closed to prevent entry of scene light during filming.

A further object of the invention is to provide a novel and improved housing for a motion picture camera, particularly for a portable motion picture camera which utilizes 8-millimeter film.

An additional object of the invention is to provide a motion picture camera wherein the coupling cannot be damaged during insertion or withdrawal of flim-containing cassettes.

The invention is embodied in an apparatus which may constitute a tape recorder or a motion picture camera and utilizes cassettes or magazines for convoluted magnetic tape, motion picture film or analogous band material. The apparatus comprises a housing having an open-ended cassette-receiving chamber and including a pair of side walls flanking the chamber and located opposite each other, coupling means provided in the housing and extending into the chamber beyond one of the side walls, and bridge means including at least one yieldable bridge member normally extending into the chamber beyond the one side wall to prevent engagement between the coupling means and a cassette during insertion or withdrawal of such cassette through the open end of the chamber. The other side wall of the housing is preferably inclined toward the one side wall in a direction away from the open end of the chamber so that, during insertion, the leading end of the cassette is caused to move closer to the one side wall. A door which can be hingedly connected to the housing is movable to and from a closed position in which it causes the inserted cassette to deform the bridge member and to thus engage with the coupling means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
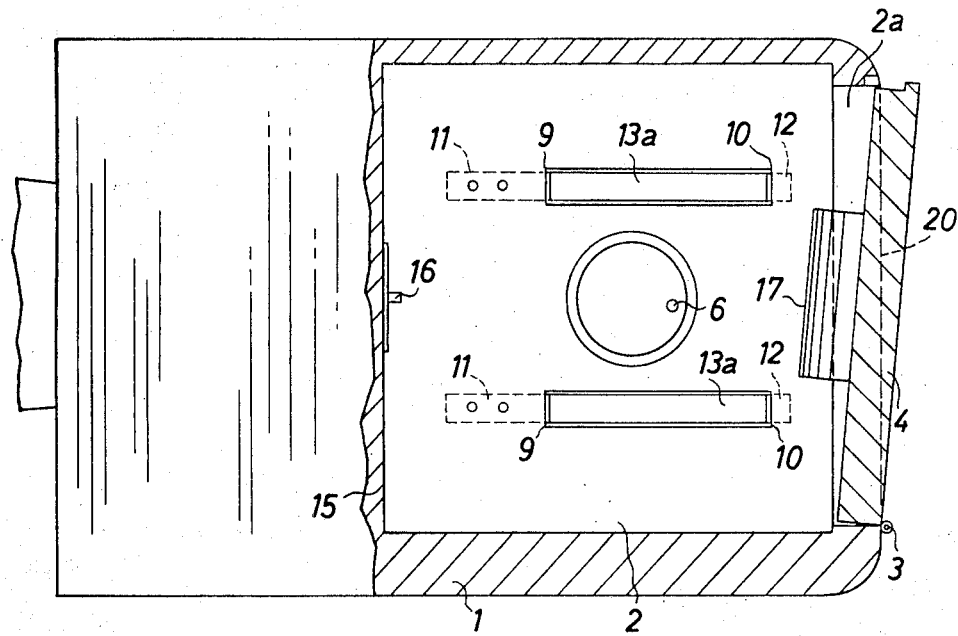
FIG. 1 is a partly side elevational and partly vertical sectional view of a motion picture camera which embodies one form of the invention.
Figure 2:
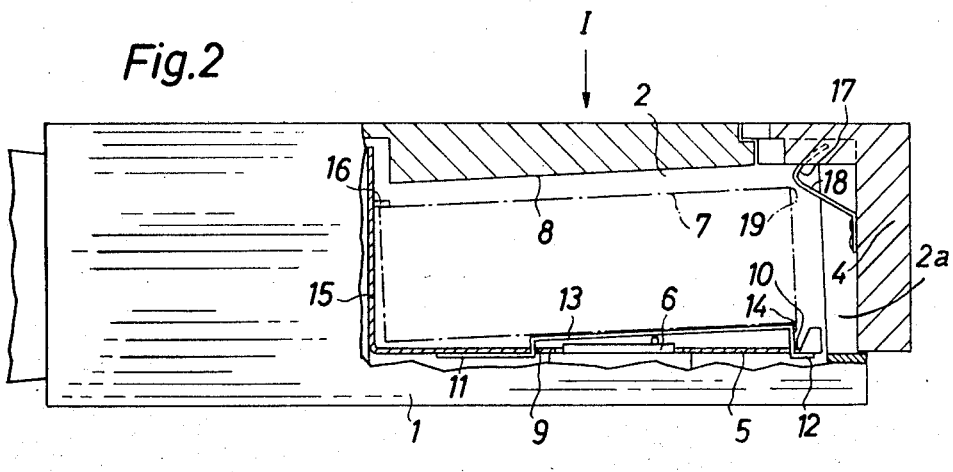
FIG. 2 is a partial plan and partial horizontal sectional view of the camera shown in FIG. 1.

The motion picture camera of FIGS. 1 and 2 comprises a housing 1 which defines a relatively narrow upright chamber 2 for a cassette or magazine 7 (indicated in FIG. 2 by phantom lines in fully inserted position but prior to engagement with the coupling). The chamber 2 has an open end 2a which is provided in the rear wall 20 of the housing 1. This open end can be exposed and closed by a door 4 which is pivotally connected to the housing 1 by a hinge 3 and is movable between a first or closed position and a second or open position. FIGS. 1 and 2 illustrate the door 4 in partly open position.

The housing 1 further comprises two side walls 5, 8 which flank the chamber 2. The side of the wall 8 is inclined toward the side wall 5 in a direction away from the open end 2a of the chamber (i.e., toward the objective of the motion picture camera) so that the chamber 2 resembles a portion of a wedge whose narrower end is remote from the door 4. The coupling 6 which can engage the reel or reels in a fully inserted cassette 7 extends into the chamber 2 beyond the side wall 5 and may but need not be movable in the direction of its axis. This coupling is flanked by a shielding structure or bridge assembly which includes two similar elastically deformable substantially U-shaped bridge members 13 which prevent the cassette 7 from engaging with the coupling 6 during insertion or removal through the open end 2a. Each bridge member 13 has a relatively short leg 11 which extends through an opening 9 in the wall 5 and is secured to the outer side of this wall, and a relatively long leg 14 which extends through an opening 10 of the side wall 5. The webs 13a of the bridge members 13 connect the respective legs 11, 14 and are normally substantially parallel to the inner surface of the inclined side wall 8. As shown in FIG. 2, the webs 13a extend into the chamber 2 beyond the innermost end of the coupling 6 so that the latter cannot interfere with insertion or withdrawal of the cassette 7. The extent to which the bridge members 13 can project into the chamber 2 is determined by the length of their legs 14. The webs 13a form a ramp along which the apertured side of the cassette 7 slides during insertion or withdrawal from the housing 1. Each longer leg 14 has a bent-over end portion 12 which abuts against the outer side of the wall 5 when the cassette 7 is removed from the chamber 2 as well as during insertion and removal of the cassette.

The transversely extending vertical internal partition 15 of the housing 1 carries at least one retaining member 16 (e.g., a projection in the form of a post or stud) which engages the leading end of the inserted cassette 7 and prevents it from moving away from the side wall 5 during closing of the door 4. The latter includes a displacing member in the form of a suitably bent leaf spring 17 which has an inclined cam face 18 adapted to engage the edge 19 at the trailing end of the inserted cassette 7 while the door 4 moves toward its closed position. The spring 17 causes the cassette 7 to pivot about the retaining member 16 and to deform the bridge members 13 so that its reel or reels can engage with the coupling 6 when the door 4 assumes its closed position. The direction in which the inserted cassette 7 pivots with reference to the post 16 is indicated by arrow I shown in FIG. 2.

When the door 4 is thereupon moved to open position, the spring 17 moves away from the edge 19 and the bridge members 13 are free to reassume their normal unstressed positions so that the cassette 7 pivots with reference to the retaining member 16 (in a counterclockwise direction, as viewed in FIG. 2) and is moved away from engagement with the coupling 6. The user of the camera is then free to withdraw the cassette without any interference on the part of the coupling 6. The same applies for insertion of a fresh cassette; such cassette slides along the ramp formed by the webs 13a of the bridge members 13 and its leading end engages the retaining member 16 so that it can pivot in response to closing of the door 4 whereby its reel or reels engage with the coupling 6.

The improved camera is susceptible of many modifications without departing from the spirit of our invention. For example, the retaining means may include several posts 16, a continuous ledge or other means capable of holding the leading end of the inserted cassette against movement away from the side wall 5. Also, the leaf spring 17 can be replaced with other displacing means, e.g., with one or more helical springs or a rigid displacing member. Still further, one of the bridge members 13 can be omitted and/or each such bridge member can be replaced with a different spring, for example, with an arcuate leaf spring only one end of which is anchored in or extends through the wall 5. Furthermore, the closing of door 4 could cause movement of a displacing device mounted in the wall 8 whereby such displacing device would engage the upper side of the cassette 7 (as viewed in FIG. 2) to pivot the cassette about the retaining means 16. The side wall 5 can support two discrete couplings if the cassette contains two reels which are placed side-by-side. All such modifications are so obvious in view of the preceding description that they can be readily comprehended without additional illustrations.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus of the character described, particularly in a motion picture camera utilizing film which is stored in a cassette, a combination comprising a housing having an open-ended cassette-receiving chamber and including a pair of side walls flanking said chamber and located opposite each other; coupling means provided in said housing and extending into said chamber beyond one of said side walls; and bridge means including at least one yieldable bridge member normally extending into said chamber beyond said one side wall to prevent engagement between said coupling means and a cassette during insertion or removal of such cassette through the open end of said chamber while the cassette moves between said side walls, transversely of said coupling means and along said bridge means.

2. A combination as defined in claim 1, further comprising a door movable with reference to said side walls between first and second positions in which it respectively closes and exposes the open end of said chamber, said door comprising displacing means operative to deform said bridge member by way of a cassette in said chamber in response to movement of said door to the first position thereof whereby the cassette is free to engage with said coupling means.

3. A combination as defined in claim 2, wherein said bridge member is elastic and is moved toward said one side wall in response to movement of said door to the first position thereof.

4. A combination as defined in claim 2, wherein said displacing means comprises a leaf spring.

5. A combination as defined in claim 2, wherein said displacing means comprises an inclined face which bears against and moves the cassette in said chamber toward said one side wall to thereby deform said bridge member in response to movement of said door toward its first position.

6. A combination as defined in claim 1, further comprising retaining means provided in said chamber opposite said open end thereof and positioned to engage the leading end of an inserted cassette, and means for pivoting the inserted cassette with reference to said retaining means so that the cassette thereby deforms said bridge member and engages with said coupling means.

7. A combination as defined in claim 6, wherein said means for pivoting comprises a door which is movable with reference to said housing to a position in which it closes the open end of said chamber and thereby pivots the inserted cassette with reference to said retaining means.

8. In an apparatus of the character described, particularly in a motion picture camera utilizing film which is stored in a cassette, a combination comprising a housing having an open-ended cassette-receiving chamber and including a pair of side walls flanking said chamber and located opposite each other, the width of said chamber between said side walls decreasing in a direction away from said open end thereof; coupling means provided in said housing and extending into said chamber beyond one of said side walls; and bridge means including at least one yieldable bridge member normally extending into said chamber beyond said one side wall to prevent engagement between said coupling means and a cassette during insertion or removal of such cassette through the open end of said chamber.

9. In an apparatus of the character described, particularly in a motion picture camera utilizing film which is stored in a cassette, a combination comprising a housing having a cassette-receiving chamber and including a pair of side walls flanking said chamber and located opposite each other and a rear wall, said chamber having an open end provided in said rear wall; coupling means provided in said housing and extending into said chamber beyond one of said side walls; and bridge means including at least one yieldable bridge member normally extending into said chamber beyond said one side wall to prevent engagement between said coupling means and a cassette during insertion or removal of such cassette through the open end of said chamber.

10. A combination as defined in claim 9, wherein the other of said side walls is inclined toward said one side wall in a direction away from said rear wall and wherein said bridge member comprises a cassette-engaging portion which is normally substantially parallel to said other side wall.

11. A combination as defined in claim 10, wherein said bridge means includes a pair of bridge members extending beyond said one side wall at the opposite sides of said coupling means.

12. In an apparatus of the character described, particularly in a motion picture camera utilizing film which is stored in a cassette, a combination comprising a housing having an open-ended cassette-receiving chamber and including a pair of side walls flanking said chamber and located opposite each other; coupling means provided in said housing and extending into said chamber beyond one of said side walls; bridge means including at least one yieldable bridge member normally extending into said chamber beyond said one side wall to prevent engagement between said coupling means and a cassette during insertion or removal of such cassette through the open end of said chamber; and a door movable with reference to said side walls between first and second positions in which it respectively closes and exposes the open end of said chamber, said door comprising displacing means operative to deform said bridge member by way of a cassette in said chamber in response to movement of said door to the first position thereof whereby the cassette is free to engage with said coupling means, said bridge member comprising a substantially U-shaped spring having a pair of legs extending through openings provided in said one side wall and a web located in said chamber adjacent to one side of an inserted cassette, at least one of said legs being movable with reference to said one side wall to permit movement of said web toward said one side wall in response to movement of said door toward the first position thereof.

* * * * *